(12) United States Patent
Karpati et al.

(10) Patent No.: US 8,370,886 B2
(45) Date of Patent: Feb. 5, 2013

(54) RETURN FEED FORWARD

(75) Inventors: George S. Karpati, Quakertown, PA (US); Robert L. Howald, Orlando, FL (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 12/634,427

(22) Filed: Dec. 9, 2009

(65) Prior Publication Data
US 2011/0138436 A1      Jun. 9, 2011

(51) Int. Cl.
*H04N 7/173*      (2011.01)
(52) U.S. Cl. ......... 725/95; 725/105; 725/121; 725/127
(58) Field of Classification Search ............. 725/64–65, 725/74–85, 95, 105, 121, 127
See application file for complete search history.

(56) References Cited

U.S. PATENT DOCUMENTS

| | | | |
|---|---|---|---|
| 6,622,304 B1 * | 9/2003 | Carhart ........................... | 725/74 |
| 6,741,604 B1 * | 5/2004 | Rippin et al. ................. | 370/431 |
| 7,490,345 B2 * | 2/2009 | Rakib et al. .................... | 725/111 |
| 2002/0174435 A1 * | 11/2002 | Weinstein et al. ............. | 725/80 |
| 2005/0010958 A1 * | 1/2005 | Rakib et al. .................... | 725/111 |
| 2005/0155082 A1 * | 7/2005 | Weinstein et al. ............ | 725/131 |

* cited by examiner

*Primary Examiner* — Pankaj Kumar
*Assistant Examiner* — Charles N Hicks
(74) *Attorney, Agent, or Firm* — Lori Ann D. Swanson

(57) ABSTRACT

Provided is a device for use with a headend, a household and an amplifier. The headend is able to provide signals within a high-frequency band $f_H$. The household is able to provide signals within a low-frequency band $f_L$, and to provide signals within a super-high-frequency band $f_R$, where $f_L < f_H < f_R$. The device includes a splitter, a diplexer and a combiner. The splitter is arranged to receive the signals within the high-frequency band $f_H$ and to split the signals within the high-frequency band $f_H$ into a first signal portion within the high-frequency band $f_H$ and a second signal portion within the high-frequency band $f_H$. The diplexer is operable to pass the second signal portion within the high-frequency band $f_H$ to the household, to pass the signals within the low-frequency band $f_L$ to the splitter and to pass the signals within the super-high-frequency band $f_R$. The combiner is operable to provide, to the amplifier, the first signal portion within the high-frequency band $f_H$ and the signals within the super-high-frequency band $f_R$.

10 Claims, 4 Drawing Sheets

RETURN FEED FORWARD

BACKGROUND

Traditionally, cable television systems have delivered entertainment video to subscriber homes. However, in addition to cable television channels, cable systems may provide extended services such as video-on-demand and high-speed internet access. With the expanding usage of the internet and email, the amounts of data being uploaded from subscriber homes is increasing. Sending email attachments or uploading videos or pictures to the web require transferring large amounts of data from subscriber homes back to the cable headend, which requires a considerable amount of bandwidth on the return path. Since the return bandwidth in conventional cable systems is typically restricted to a very narrow band, this often presents a bottleneck that restricts fast and efficient data uploading on the subscriber end.

FIG. 1 illustrates a general schematic of a conventional cable system. System 100 includes a headend 102, a plurality of fibers 104, a plurality of nodes 106, a plurality of coaxial feeder cables 108, a plurality of taps (not shown), a plurality of coaxial cable drops 110, a plurality of amplifiers 112, a plurality of subscriber households 114 and a plurality of terminal equipment 116.

In operation, program content and/or data is received via signals from antenna towers, satellites, or direct fiber links at headend 102. The content is modulated onto an electromagnetic carrier, becoming a radio frequency (RF) signal. At headend 102, each signal is assigned a unique channel frequency that occupies a unique portion of the frequency spectrum. Fibers 104 then transmit the RF energy of the signals as light, from headend 102 down to individual nodes 106. Nodes 106 each then convert the optical signals back to RF signals and transmit them on coaxial feeder cables 108. Along coaxial feeder cables 108 there are various taps (not shown) where the signal is distributed to homes by being "tapped off" to coaxial cable drops 110, which run to individual subscriber households 114 that contain terminal equipment 116 (such as set-top boxes, cable modems, etc). Also, at points along coaxial feeder cables 108, there are amplifiers 112 that amplify the signal to maintain adequate signal strength to other taps down the coaxial cable.

A more detailed representation of a conventional cable system is shown in FIG. 2. System 200 includes a headend 202, a node 204, an RF amplifier 206, a conventional tap 208, a subscriber household 210, a RF amplifier 212, and subsequent taps 214 that continue to an end of the line 216, which include a standard tap with an RF terminating resistor load that maintains a consistent impedance to the coaxial cable. Conventional tap 208 includes a splitter/combiner 218. Subscriber household 210 includes a set top converter 220, a cable modem 221 and a computer 222. For ease of explanation, in FIG. 2 only one node (node 204), one tap (conventional tap 208), and one subscriber household (subscriber household 210) are shown, even though a typical cable system consists of a plurality of nodes, taps, and subscriber households (as illustrated in FIG. 1).

Headend 202 is arranged to communicate bi-directionally with node 204 via a communication line 224 that may include one or more optical fibers. Node 204 is additionally arranged to communicate bi-directionally with RF amplifier 206 via a communication line 226. RF amplifier 206 is arranged to communicate bi-directionally with conventional tap 208 via a communication line 228. Conventional tap 208 is arranged to communicate bi-directionally with subscriber household 210 via a communication line 230. Inside subscriber household 210, communication line 230 is split into communication line 232 and communication line 234. Communication line 232 bi-directionally connects set top converter 220 with communication line 230. Communication line 234 bi-directionally connects cable modem 221 with communication line 230. Cable modem bi-directionally connects computer 222 to communication line 230. Conventional tap 208 is additionally arranged to communicate bi-directionally with RF amplifier 212 via a communication line 236. RF amplifier 212 is arranged to communicate bi-directionally with subsequent taps 214 via a communication line 238.

As mentioned above, headend 202 is operable to receive data from sources (not shown), such as an antenna tower, satellite dish or studio link/feed. Headend 202 is further operable to process the data for transmission to subscriber households, including subscriber household 210. Node 204 is operable to convert optical signals to RF signals. RF amplifier 206 is operable to amplify signals to maintain signal strength. Splitter/combiner 218 within conventional tap 208 "splits" or "taps-off" signals to subscriber household 212, as well as passes the signals to other taps and amplifiers. Similar to RF amplifier 206, RF amplifier 212 is operable to amplify signals to maintain signal strength. Similar to conventional tap 208, conventional taps 214 are operable to "tap-off" signals to other downstream households (not shown).

In operation, headend 202 receives and processes data. Headend 202 then transmits signals "downstream," i.e., in a direction from headend 202 toward the end of the line 216, via communication line 224 to node 204. Node 204 receives the signals from headend 202, converts the signals and transmits converted signals to RF amplifier 206. Conventionally, communication line 224 is an optical fiber and communication line 226 is a coaxial cable, wherein node 204 converts the optical signals to RF signals. The remainder of communication lines 226, 228, 230, 232, 236 and 238 are conventionally coaxial cables. However, it should be noted that communication lines 224, 226, 228, 230, 232, 236 238 and 239 may be any known form of communication line, non-limiting examples of which include optical fiber, coaxial cable and wireless.

At this point, RF amplifier 206 amplifies the RF signals to maintain signal strength due to the inherent loss in the coaxial cable, before passing the signals to conventional tap 208. As mentioned above, splitter/combiner 218 of conventional tap 208 splits the signals within communication line 226 and provides the signals to subscriber household 210 via communication line 230. Conventional tap 208 distributes to both subscriber household 210 and down communication line 236 to RF amplifier 212 and down stream to other taps and RF amplifiers down the communication line/coax until the end of line tap know as the terminating tap.

The above-discussed transmission, headend to subscriber and terminating tap, of data corresponds to downstream transmissions. In conventional cable systems, data may also travel "upstream," in a direction from subscriber household 210 back up to headend 202, along the same components, such as RF amplifiers and taps and wires, such as coaxial cable and optical fiber. Since both upstream and downstream signals travel on the same medium, upstream and downstream signals must occupy different frequencies. Typically downstream signals are restricted to a given high-frequency band, but not exclusively, and is denoted as $f_H$, whereas upstream signals are restricted to a given low-frequency band, but not exclusively, and is denoted as $f_L$, wherein $f_H > f_L$.

As illustrated in FIG. 2, headend 202 provides signals 240 within high-frequency band $f_H$ downstream to splitter/combiner 218. Splitter/combiner 218 splits signals 240 and provides signals 242 within high-frequency band $f_H$ to subscriber household 210. Signals 242 are then provided to set top converter 220, cable modem 221 and computer 222. Splitter/combiner 218 additionally provides signals 244 within high-frequency band $f_H$ downstream to RF amplifier 212 and subsequent taps 214 and subsequent RF amplifiers (not shown) further downstream.

As illustrated in FIG. 2, either one of set top converter 220 and cable modem 221 is able to send information upstream to headend 202. For example, set top converter 220 may send request information for viewing specific content on demand or may have interactive programming information related to cable television, whereas cable modem 221 may enable computer 222 to upload information via the Internet. Such conventional upstream data is provided in signals 246 within a low-frequency band $f_L$ to splitter/combiner 218. Splitter/combiner 218 is additionally able to receive signals 248 within low-frequency band $f_L$ from RF amplifier 212 and subsequent taps 214 and subsequent RF amplifiers (not shown) further downstream. Splitter/combiner 218 is operable to combined signals 246 within low-frequency band $f_L$ and signals 248 within low-frequency band $f_L$ and transmit the combined signals to headend 202 as signals 250 within low-frequency band $f_L$.

In conventional cable systems, the upstream bandwidth is much smaller than the downstream bandwidth. Most cable systems are using an upstream, subscriber to headend, bandwidth of approximately 35 MHz, while the downstream bandwidth is typically around 50 MHz-1 GHz from the headend. The limiting upstream bandwidth is due to the fact that when cable television systems were first implemented in the 1960s, the requirement for a large return bandwidth was not needed at the time. However, since the advent of the internet, there is an ever increasing need for greater return bandwidth. This is due in large part to the increasing amounts of data being transmitted upstream from subscriber households back to the headend, e.g., sending email, uploading of large files such as video, images, music. Returning back to FIGS. 1 and 2, signals 250 within low-frequency band $f_L$ may include data supplied from each of subscriber households 114. Thus, the upstream flow of data can easily become a major bottleneck in conventional cable systems. This bottleneck may severely restrict the speed of data uploads from subscriber households 114.

What is needed is a cable system and method that is able to increase the amount of data that can be sent from the subscriber household back to the headend.

BRIEF SUMMARY

An aspect of the present invention provides a cable system and method that is able to increase the amount of data that can be sent from the subscriber household back to the headend.

In accordance with an aspect of the present invention, a device is provided for use with a headend, a household and an amplifier. The headend is able to provide signals within a high-frequency band $f_H$. The household is able to provide signals within a low-frequency band $f_L$ and to provide signals within a super-high-frequency band $f_R$ where $f_L < f_H < f_R$. The device includes a splitter, a diplexer and a combiner. The splitter is arranged to receive the signals within the high-frequency band $f_H$ and to split the signals within the high-frequency band $f_H$ into a first signal portion within the high-frequency band $f_H$ and a second signal portion within the high-frequency band $f_H$. The diplexer is operable to pass the second signal portion within the high-frequency band $f_H$ to the household, to pass the signals within the low-frequency band $f_L$ to the splitter and to pass the signals within the super-high-frequency band $f_R$. The combiner is operable to provide, toward the amplifier, the first signal portion within the high-frequency band $f_H$ and the signals within the super-high-frequency band $f_R$.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

In accordance with an aspect of the present invention, a cable system provides for greater return bandwidth for upstream data via the use of modified taps and an additional return path.

An aspect in accordance with the present invention will now be described with reference to FIG. 3.

Figure 1:
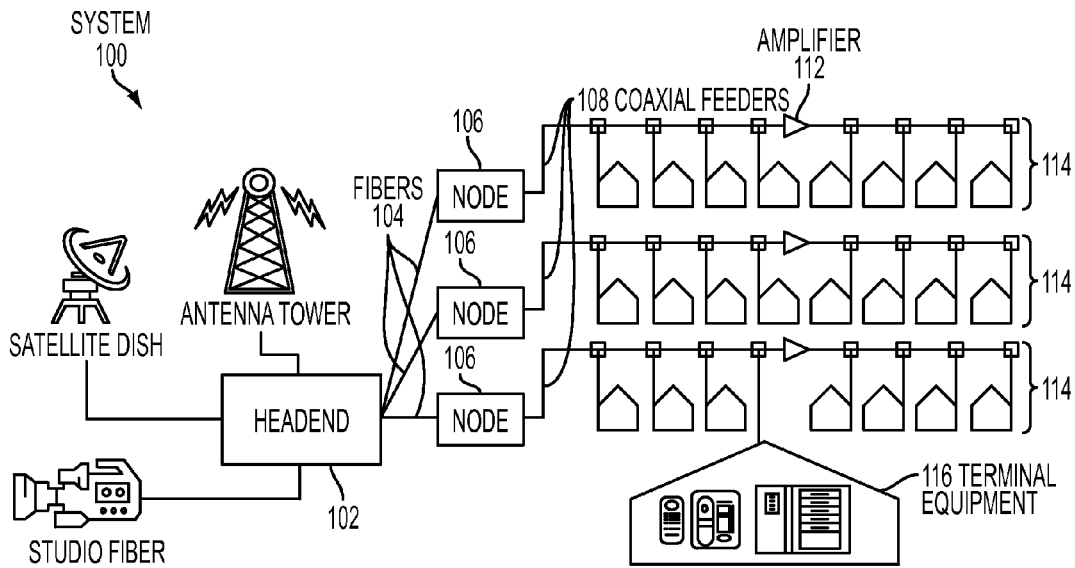
FIG. 1 illustrates a general schematic of a conventional cable system.
Figure 2:
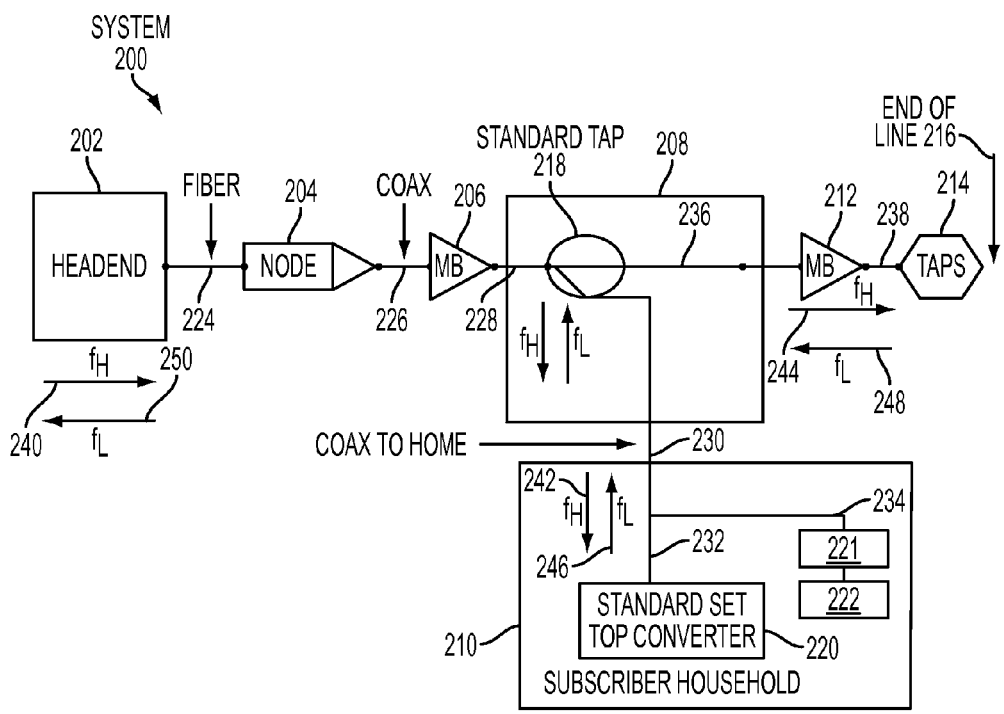
FIG. 2 illustrates a more detailed representation of a conventional cable system.
Figure 3:
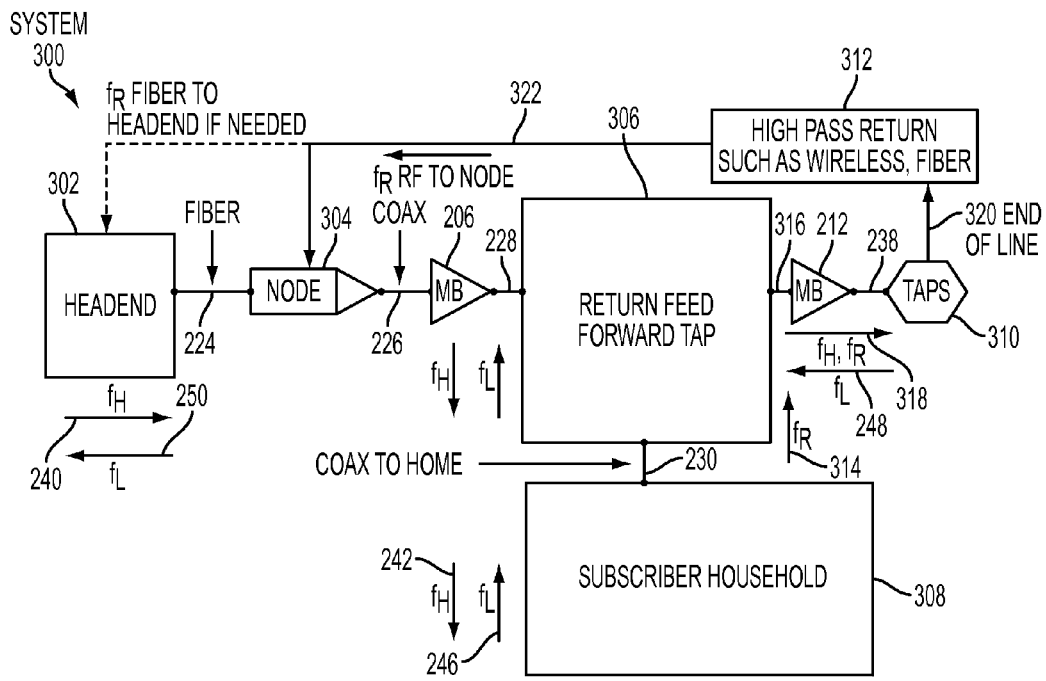
FIG. 3 illustrates a schematic of an example modified cable system in accordance with an aspect of the present invention.

FIG. 3 illustrates a schematic of an example modified cable system in accordance with an aspect of the present invention. System 300 includes headend 302, node 304, RF amplifier 206, return feed-forward tap 306, subscriber household 308, RF amplifier 212, subsequent taps 310, and a high pass return path 312. As with system 200 in FIG. 2, for ease of explanation, in FIG. 3 only one node (node 304), one tap (return feed-forward tap 306), and one subscriber household (subscriber household 308) are shown. In actual implementation, a modified cable system may include a plurality of nodes, taps, RF amplifiers and subscriber households.

Headend 302 is arranged to communicate bi-directionally with node 304 via a communication line 224. Node 304 is additionally arranged to communicate bi-directionally with RF amplifier 206 via a communication line 226. RF amplifier 206 is arranged to communicate bi-directionally with return feed-forward tap 306 via a communication line 228. Return feed-forward tap 306 is arranged to communicate bi-directionally with subscriber household 308 via communication line 230. Return feed-forward tap 306 is additionally arranged to communicate bi-directionally with RF amplifier 212 via a communication line 316. RF amplifier 212 is arranged to communicate bi-directionally with subsequent taps 310 and subsequent RF amplifiers (not shown) via communication line 238. A last tap at the end of the line (not shown) is arranged to communicate with high pass return 312 via a communication line 320. High pass return 312 is operable to communicate with node 304 via a communication line 322.

Headend 302 is operable to receive data from sources (not shown), such as an antenna tower, satellite dish or studio feed. Headend 302 is further operable to process the data for transmission to subscriber households, including subscriber household 308. Node 304 is operable to convert optical signals to RF signals. RF amplifier 206 is operable to amplify signals to maintain signal strength. Return feed-forward tap 306 "splits" or "taps-off" signals to subscriber household 308, as well as simultaneously passing the signals to sequent RF amplifiers and taps (not shown). Similar to RF amplifier 206, RF amplifier 212 is operable to amplify signals to maintain signal strength.

In operation, headend 302 receives and processes data. Headend 302 then transmits signals 240 within high-frequency band $f_H$ downstream via communication line 224 to node 304. Node 304 receives the signals from headend 302, converts the signals, from optical to RF, and transmits converted signals to RF amplifier 206. Similar to system 200 discussed above with respect to FIG. 2, communication line 224 may an optical fiber and communication line 226 may a coaxial cable, wherein node 304 converts the optical signals to RF signals. The remainder of communication lines 230, 316, 238 and 320 may be coaxial cables. However, it should be noted that communication lines 226, 230, 316, 238, 320 may be any known form of communication line, non-limiting examples of which include optical fiber, coaxial cable and wireless.

At this point, RF amplifier 206 amplifies the RF signals to maintain signal strength to compensate for losses incurred through cable, before passing signals 242 within high-frequency band $f_H$ to return feed-forward tap 306. As mentioned above, return feed-forward tap 306 splits the signals within communication line 228 and provides signals 242 within high-frequency band $f_H$ to subscriber household 308 via communication line 230. In addition to providing signals to subscriber household 308, return feed-forward tap 306 provides signals within high-frequency band $f_H$ to communication line 316 and to RF amplifier 212 and subsequent taps 310.

Similar to system 200 discussed above with reference to FIG. 2, subscriber household 308 is able to send information upstream to headend 302. Such conventional upstream data is provided in signals 246 within low-frequency band $f_L$ to return feed-forward tap 306. Return feed-forward tap 306 is additionally able to receive signals 248 within low-frequency band $f_L$ from RF amplifier 212 and subsequent taps 310 further downstream as well as subsequent RF amplifiers (not shown). Return feed-forward tap 306 is operable to combined signals 246 within low-frequency band $f_L$ and signals 248 within low-frequency band $f_L$ and transmit the combined signals to headend 302 as signals 250 within low-frequency band $f_L$.

As discussed in more detail below, subscriber household 308 is further operable to send signals 314 within a super-high-frequency band $f_R$, wherein $f_R > f_H > f_L$, to headend 302. Specifically, signals 314 within a super-high-frequency band $f_R$ are provided to return feed-forward tap 306 via communication line 230. Return feed-forward tap 306 combines signals 314 within a super-high-frequency band $f_R$ with signals 240, from headend 302, within high-frequency band $f_H$ as combined signals 318 signals within high-frequency band $f_H$ and within super-high-frequency band $f_R$. Return feed-forward tap 306 then transmits combined signals 318 signals within high-frequency band $f_H$ and within super-high-frequency band $f_R$ downstream to RF amplifier 212 via communication line 316 and then to subsequent taps 310 as well as subsequent RF amplifiers (not shown), further downstream via communication line 238. At the end of the line, combined signals 318 signals within high-frequency band $f_H$ and within super-high-frequency band $f_R$ are provided to high pass return 312 via communication line 320. High pass return 312 then transmits to node 304 via communication line 322, the portion of combined signals 318 signals within high-frequency band $f_H$ and within super-high-frequency band $f_R$ corresponding to the signals within super-high-frequency band $f_R$, as signals 314 within super-high-frequency band $f_R$.

System 300 has some key differences from system 200. First, return feed-forward tap 306 is different from a conventional tap 208 of system 200. In addition to passing signals within high-frequency band $f_H$ downstream to subscriber household 308 and to subsequent taps 310 and passing signals within low-frequency band $f_L$ upstream from subscriber household 308 back to headend 302, return feed-forward tap 306 also has the capability to pass signals within super-high-frequency band $f_R$ to headend 302 from subscriber household 308 by way of subsequent taps 310 as well as subsequent RF amplifiers (not shown). In essence, return feed-forward tap 306 has the ability to send data/signals from subscriber household 308 simultaneously to RF amplifier 212 via communication line 316 as well as RF amplifier 206 via communication line 228.

High pass return path 312 may be implemented with a single node and amplifier (not shown), and may be located at the very end of line, i.e., the very last tap. In this manner, the available return bandwidth for subscriber household 308 to headend 302 is increased from just the low-frequency band $f_L$ as provided in system 200 discussed above with reference to FIG. 2, to a band that includes low-frequency band $f_L$ and super-high-frequency band $f_R$.

A more detailed discussion of return feed-forward tap 306 and subscriber household 308 will now be described with reference to FIG. 4.

Figure 4:
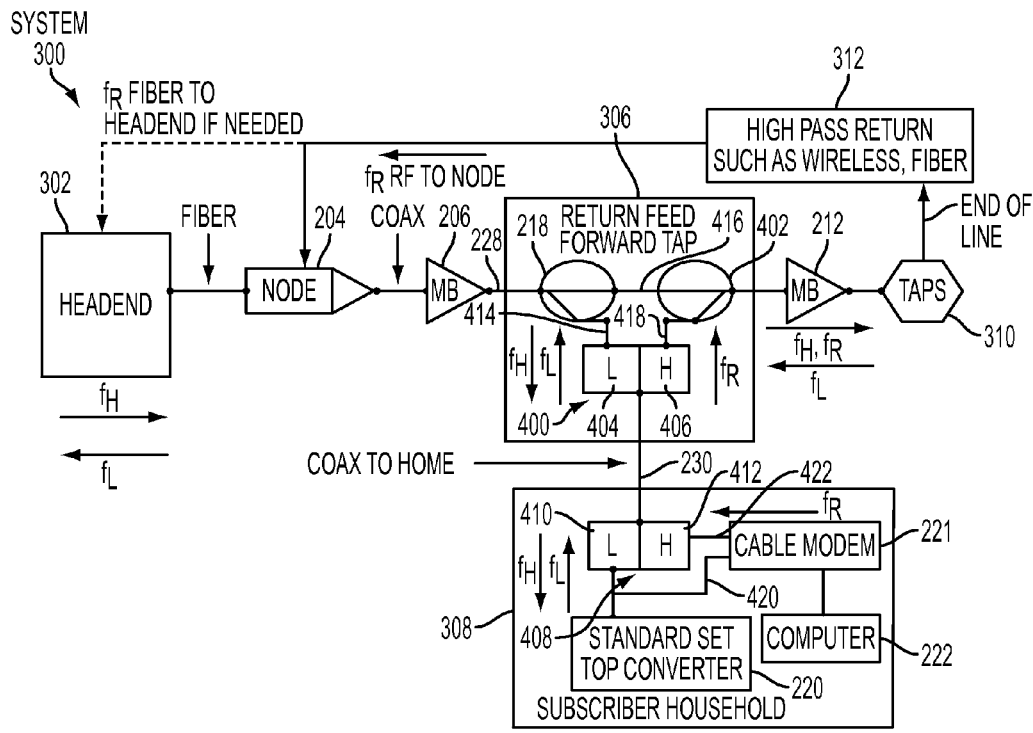
FIG. 4 illustrates a more detailed representation of an example modified cable system in accordance with an aspect of the present invention.

FIG. 4 illustrates a more detailed representation of system 300 of FIG. 3. In FIG. 4, the details of return feed-forward tap 306 and subscriber household 308 are shown. Like conventional tap 208 of system 200 in FIG. 2, return feed-forward tap 306 includes splitter/combiner 218. However, return feed-forward tap 306 additionally includes a diplexer 400 and an RF combiner 402. Diplexer 400 includes a low-pass filter 404 and a high-pass filter 406. Splitter/combiner 218 is arranged to bi-directionally communicate with RF amplifier 206 via communication line 228. Low-pass filter 404 is arranged to bi-directionally communicate with splitter/combiner 218 via communication line 414. High-pass filter 406 is arranged to communicate with RF combiner 402 via communication line 418. Splitter/combiner 218 is additionally arranged to bi-directionally communicate with RF combiner 402 via communication line 416.

In FIG. 4, the details of subscriber household 308 are also shown. Like system 200 of FIG. 2, subscriber household 308 contains conventional set top converter 220, a cable modem 221 and a computer 222. However, subscriber household 308 also includes a diplexer 408. Diplexer 408 includes a low-pass filter 410 and a high pass filter 412. Low-pass filter 410 is arranged to bi-directionally communicate with diplexer 400 via communication line 230. High-pass filter 412 is arranged to communicate with diplexer 400 via communication line 230. Low-pass filter 410 is additionally arranged to bi-directionally communicate with conventional set top converter 220 and cable modem 221 via a communication line 420. Cable modem 221 is additionally arranged to communicate with high-pass filter 412 via a communication line 422. Cable modem 221 is additionally arranged to bi-directionally communicate with computer 222.

Subscriber Household 308 is now able, in accordance with an aspect of the present invention, to send signals 246 through low pass filter 410 of diplexer 408 via communication line 230 from conventional set top converter 220 and cable modem 221 is simultaneously able to send signals 314 through high pass filter 412 of diplexer 408 to return feed-forward tap 306. This will be described in more detail below.

In operation, splitter/combiner 218 receives signals 240 from headend 302 within high-frequency band $f_H$ from RF amplifier 206 via communication line 228. Splitter/combiner 218 then splits signals 240 within high-frequency band $f_H$ and transmits the signals to diplexer 400 via communication line 414 and to RF combiner 402 via communication line 416. Low-pass filter 404 of diplexer 400 is passes signals 240 within high-frequency band $f_H$ to low-pass filter 410 of diplexer 408 via communication line 230. Low-pass filter 410 of diplexer 408 then passes signals 240 within high-frequency band $f_H$ to conventional set top converter 220. As discussed above, signals 240 within high-frequency band $f_H$ may include data corresponding to at least one of television data that will be decoded by conventional set top converter 220 and internet data that will be processed by cable modem 221.

Similar to system 200 discussed above with reference to FIG. 2, conventional set top converter 220 and cable modem 221 of system 300 are able to send data upstream to headend 302. A homeowner may wish to request a specific television show, or may wish to interactively engage with offered television services by way of conventional set top converter 220. Further, the homeowner may wish to upload data from computer 222 through cable modem 221 to the Internet. In these cases, signals 246 within low-frequency band $f_L$ may be provided from conventional set top converter 220 and cable modem 221 to low-pass filter 410 of diplexer 408 via communication line 420. Low-pass filter 410 of diplexer 408 then passes signals 246 within low-frequency band $f_L$ to low-pass filter 404 of diplexer 400 via communication line 230. Low-pass filter 404 of diplexer 400 then passes signals 246 within low-frequency band $f_L$ to splitter/combiner 218 via communication line 414. Splitter/combiner 218 then combines signals 246 within low-frequency band $f_L$ with signals 248 within low-frequency band $f_L$, from other subscriber households downstream, and transmits the combined signals to headend 302 as signals 250 within low-frequency band $f_L$.

In contrast to system 200 discussed above with reference to FIG. 2, conventional set top converter 220 and computer 222 of system 300 are further able to send signals 314 within a super-high-frequency band $f_R$, wherein $f_R > f_H > f_L$, to headend 302. At least one of conventional set top converter 220 and cable modem 221 may be modified to upload signals within super-high-frequency band $f_R$. In these cases, signals 314 within a super-high-frequency band $f_R$ may be provided from cable modem 221 to high-pass filter 412 of diplexer 408 via communication line 422. High-pass filter 412 of diplexer 408 then passes signals 314 within a super-high-frequency band $f_R$ to high-pass filter 406 of diplexer 400 via communication line 230. High-pass filter 406 of diplexer 400 then passes signals 314 within a super-high-frequency band $f_R$ to RF combiner 402. RF combiner 402 then combines signals 314 within a super-high-frequency band $f_R$ with signals 240 from headend 302. Within high-frequency band $f_H$, from splitter/combiner 218 via communication line 416 and transmit the combined signals to RF amplifier 212 via communication line 316. In this manner, a return feed forward tap in accordance with an aspect of the present invention allows both the transmissions from subscriber household 308 in both directions simultaneously wherein the available return bandwidth from subscriber household 308 back to headend 302 is the sum of low-frequency band $f_L$ and the super-high-frequency band $f_R$. In addition to simultaneous transmission from subscriber household 308, headend 302 may control cable modem 221 and setup converter 220 to either send the subscriber household data/transmissions entirely to headend 302 via low-frequency $f_l$ band for signals 246 or entirely to the super high frequency $f_r$ band for signals 314 or both. In addition to headend 302 having control as to which frequency to send data/transmission, headend 302 can use "up-conversion" of its cable modem (not shown) to set data/transmission to either the low-frequency $f_l$ band for signals 246 or the super high frequency $f_r$ band for signals 314.

In conventional cable systems such as system 200 of FIG. 2, low-frequency $f_L$ band may range from 5 MHz-40 MHz, whereas high-frequency $f_H$ band may range from 50 MHz-800 MHz. The return bandwidth ($f_L$) in a conventional system would be limited to 35 MHz. Being relatively narrow, 35 MHz would often present a bottleneck, preventing efficient data uploading from subscriber household 210 to the headend 202. Alternatively, system 300 as shown in FIG. 3 and FIG. 4, has a significantly increased return bandwidth as compared to system 200, as a result of the additional super-high-frequency band $f_R$. For example, super-high frequency $f_R$ band may range from 800 MHz-1000 MHz. In such a case, the total available return bandwidth for system 300 would be 200 MHz of the super-high frequency $f_R$ band in addition to the 35 MHz low-frequency band $f_L$, for a total of 235 MHz. As such, an example of system 300 would provide approximately six times the available return bandwidth as compared to that of conventional system 200. In accordance with this aspect of the present invention, the return bandwidth available for data to be transmitted from subscriber household 308 to headend 302 is greatly increased, thereby alleviating the bottleneck that plagues system 200 and allowing for faster uploading.

In the above-discussed example embodiments, high-pass return path 312 is in communication with node 304 via communication line 322. However, in other embodiments, high-pass return path 312 may be in direct communication with headend 302.

In general, an aspect of the present invention includes a communication system and method for transmitting: data within a first frequency band from a headend in a direction downstream to a subscriber household; data within a second frequency band from the subscriber household in a direction upstream to the headend; and data within a third frequency band from the subscriber household in a direction downstream, and then to the headend. In the above-discussed example embodiments, the first frequency band for data transmitted from the headend in the direction downstream to the subscriber household is $f_H$; the second frequency band for data transmitted from the subscriber household in the direction upstream to the headend is $f_L$; and the third frequency band for data transmitted from the subscriber household in a direction downstream, and then to the headend is $f_R$, where $f_R > f_H > f_L$. In other words, $f_R$ is greater than $f_H$ and has no overlapping frequencies with $f_H$, and $f_H$ is greater than $f_L$ and has no overlapping frequencies with $f_L$. This will be discussed in more detail below with reference to FIGS. 5-6C.

Figure 5:
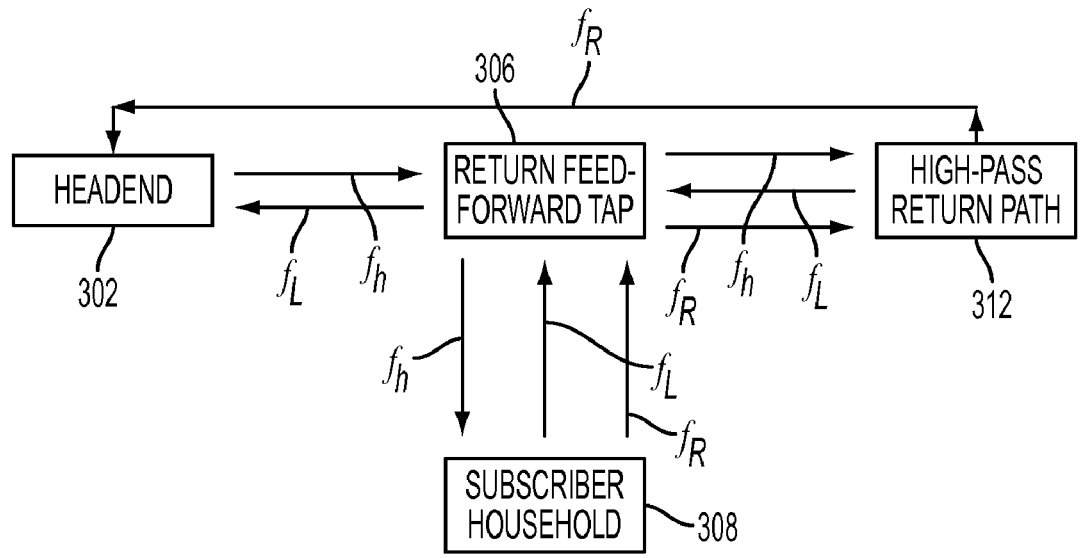
FIG. 5 illustrates directions of signal flow and example frequency bands for $f_R$, $f_H$ and $f_L$, in accordance with an aspect of the present invention.

FIG. 5 illustrates directions of signal flow and example frequency bands for $f_R$, $f_H$ and $f_L$, in accordance with an aspect of the present invention.

As illustrated in the figure, signals within frequency band $f_H$ propagate from headend 302 to return feed-forward tap 306, from feed-forward tap 306 to subscriber household 308 and from feed-forward tap 306 to high-pass return path 312. A non-limiting example of frequency band $f_H$ includes 50-870 MHz. Signals within frequency band $f_L$ propagate from subscriber household 308 to return feed-forward tap 306, from additional down-stream households (not show, in a direction from high-pass return path 312) to return feed-forward tap 306 and from return feed-forward tap 306 to headend 302. A non-limiting example of frequency band $f_L$ includes 5-40 MHz. Signals within frequency band $f_R$ propagate from subscriber household 308 to return feed-forward tap 306, from feed-forward tap 306 to high-pass return path 312 and from high-pass return path 312 to headend 302. A non-limiting example of frequency band $f_R$ includes 870-1000 MHz. Frequency bands for $f_L$, $f_H$ and $f_R$ will now be described below with reference to FIGS. 6A-6C.

Figure 6A:
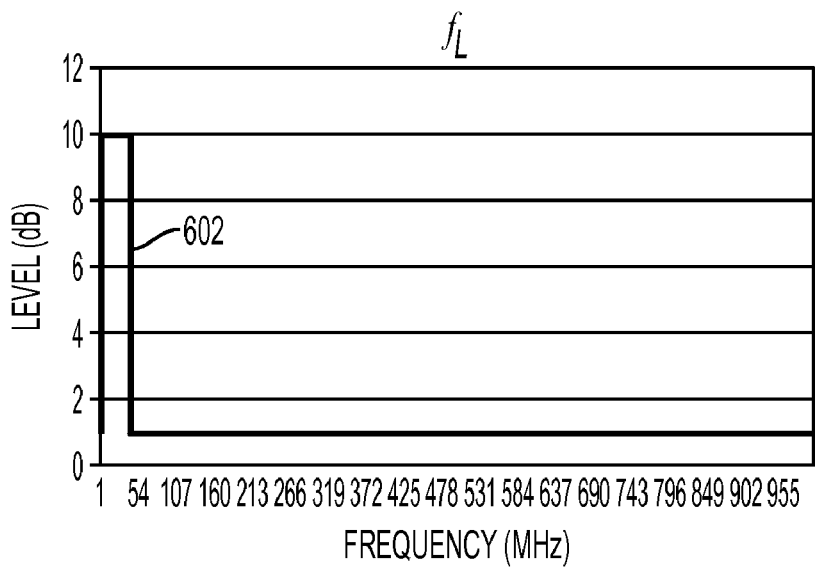
FIGS. 6A-6C are graphs of example frequency bands for $f_L$, $f_H$ and $f_R$, respectively, in accordance with an aspect of the present invention.
Figure 6B:
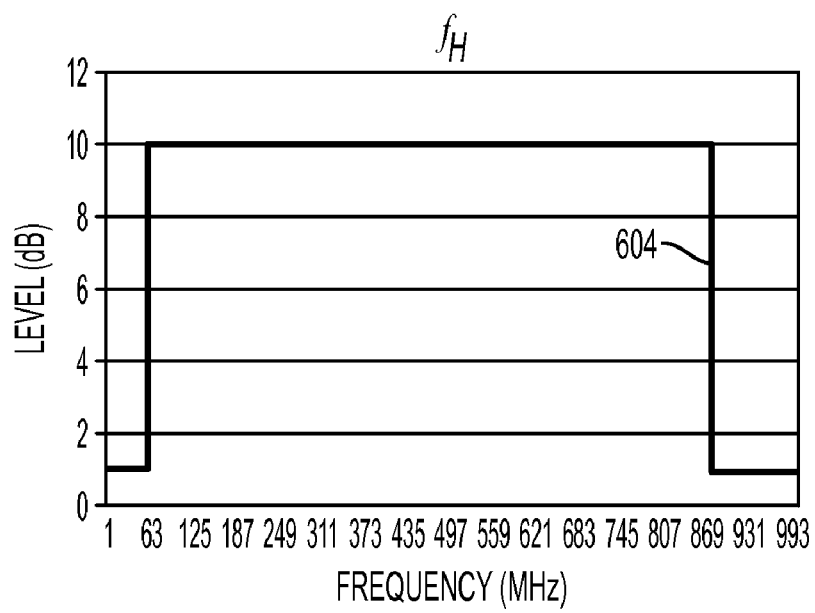
Figure 6C:
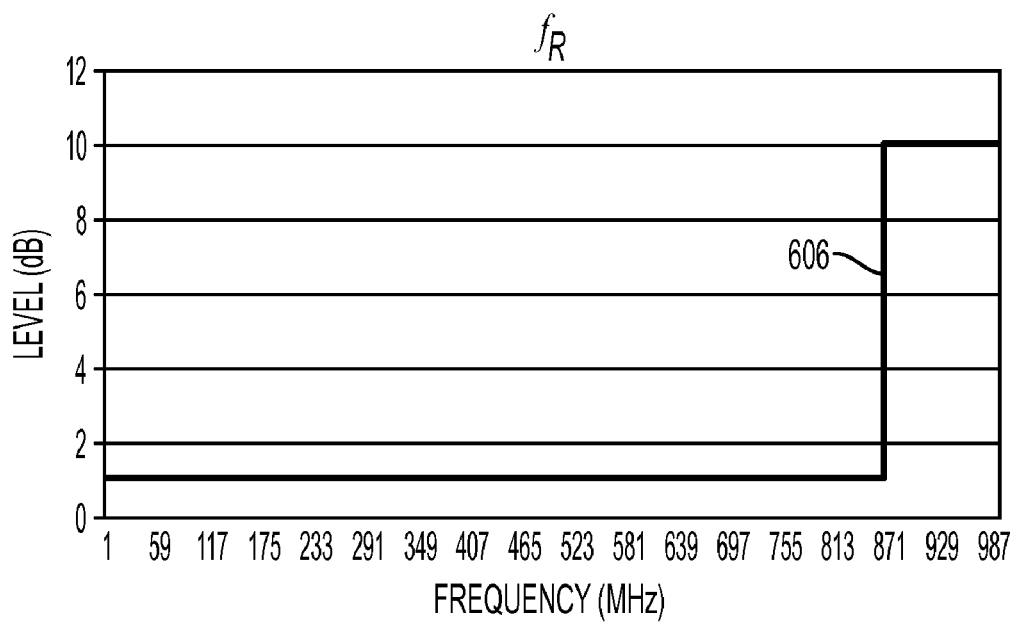

FIGS. 6A-6C are graphs of example frequency bands for $f_L$, $f_H$ and $f_R$, respectively, in accordance with an aspect of the present invention. In each of the graphs, the x-axis is frequency in MHz, whereas the y-axis is amplitude in dB. It is clear from the graphs, that the frequency band for bands for $f_L$, $f_H$ and $f_R$, do not overlap.

In other embodiments: the first frequency band for data transmitted from the headend in the direction downstream to the subscriber household is $f_H$; the second frequency band for data transmitted from the subscriber household in the direction upstream to the headend is $f_L$; and the third frequency band for data transmitted from the subscriber household in a direction downstream, and then to the headend is $f_R$, where $f_H > f_R > f_L$. In other words, in these embodiments, $f_R$ is greater than $f_L$ and has no overlapping frequencies with $f_L$, and $f_H$ is greater than $f_R$ and has no overlapping frequencies with $f_R$.

In other embodiments: the first frequency band for data transmitted from the headend in the direction downstream to the subscriber household is $f_H$; the second frequency band for data transmitted from the subscriber household in the direction upstream to the headend is $f_L$; and the third frequency band for data transmitted from the subscriber household in a direction downstream, and then to the headend is $f_R$, where $f_R > f_L$, and where $f_H > f_L$. In other words, in these embodiments, $f_R$ is greater than $f_L$ and has no overlapping frequencies with $f_L$, $f_H$ is greater than $f_L$ and has no overlapping frequencies with $f_L$, and $f_R$ may have overlapping frequencies with $f_H$. In these embodiments, data within the first frequency band $f_H$ that is transmitted from the headend in the direction downstream to the subscriber household may be distinguished from data within the third frequency band that is transmitted from the subscriber household in a direction downstream, and then to the headend is $f_R$ through any known protocol, as discussed in more detail below.

In accordance with the embodiment discussed immediately above, suppose a first subscriber household transmits data within the third frequency band in a direction downstream to a second subscriber household, before the data within the third frequency band is provided to high-pass return path 312. This data transmitted from the first subscriber household may be encoded by any known transmission standard to restrict its access. In that case, even though the second subscriber household will receive the third frequency band, the second subscriber household will be unable to access the data transmitted from the first subscriber household that is within the third frequency band.

Aspects of the present invention may be implemented into conventional cable systems by way of relatively simple modifications to the conventional cable systems. Specifically, there is no need to modify the current amplifiers (e.g., RF amplifiers 206, 210) or to completely rewire or redesign the cable system. For example, aspects of the present invention may be implemented by: replacing conventional tap 208 with return feed-forward tap 306; adding diplexer 408 to subscriber household 308; and providing high pass return path 312, non-limiting examples of which include wireless, coaxial or fiber return. In this manner, the return bandwidth may be significantly increased without having to drastically alter the current topology of an existing cable system.

In the embodiment discussed above with reference to FIG. 4, diplexers (diplexers 400 and 408) are used. However, it should be noted that multiplexers that multiplex more than two ports (e.g., triplexers, etc) could also be implemented, thereby allowing for a plurality of different frequency bands.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The exemplary embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A device for use with a headend, a household and an amplifier in a feeder line of a cable system which provides communication with a plurality of households, the headend being operable to provide signals within a first frequency band f1, in a downstream direction toward the amplifier, the household being operable to provide signals within a second frequency band f2 and to provide signals within a third frequency band f3, where second frequency band f2 has no overlapping frequencies with first frequency band f1, where second frequency band f2 has no overlapping frequencies with third frequency band f3, said device comprising:

a splitter arranged to receive the signals within the first frequency band f1 in the downstream direction from the headend to the amplifier and to split the signals within the first frequency band f1 into a first signal portion within the first frequency band f1 and a second signal portion within the first frequency band f1;

a diplexer operable to pass the second signal portion within the first frequency band f1 from the headend to the household, to pass the signals within the second frequency band f2 received from the household for transmission to the headend to said splitter and to pass the signals within the third frequency band f3 received from the household to a combiner; and the combiner receiving the first signal portion within the first frequency band f1 from the splitter and receiving the signals within the third frequency band f3 from the diplexer, the combiner operable to provide, in the downstream direction toward the amplifier, the first signal portion within the first frequency band f1 and the signals within the third frequency band f3 and the amplifier coupled to a high-pass return transmitting the first signal portion within the first frequency band f1 and the signals within the third frequency band f3 in an upstream direction toward the headend.

2. The device of claim 1, wherein said diplexer comprises a low-pass filter portion and a high-pass filter portion.

3. The device of claim 2, wherein said low-pass filter portion is operable to pass the signals within the second frequency band f2 from the subscriber household to said splitter.

4. The device of claim 3, wherein said high-pass filter portion is operable to pass, from the household, the signals within the third frequency band f3 to the combiner.

5. The device of claim 4, wherein the third frequency band f3 has overlapping frequencies with the first frequency band f1.

6. The device of claim 3, wherein the third frequency band f3 has overlapping frequencies with the first frequency band f1.

7. The device of claim 2, wherein said high-pass filter portion is operable to pass, from the household, the signals within the third frequency band f3 to the combiner.

8. The device of claim 7, wherein the third frequency band f3 has overlapping frequencies with the first frequency band f1.

9. The device of claim 1, wherein the third frequency band f3 has overlapping frequencies with the first frequency band f1.

10. A method of transmitting data within a transmission system having a headend, a tap, a household and an amplifier in a feeder line of a cable system which provides communication with a plurality of households, the headend being operable to provide signals within a first frequency band f1 in a downstream direction to the tap, the tap being operable to provide the signals within the first frequency band f1 from the headend to the household and in the downstream direction to the amplifier, said method comprising:

receiving signals within the first frequency band f1 in the downstream direction;

splitting the signals within the first frequency band f1 into a first signal portion within the first frequency band f1 and a second signal portion within the first frequency band f1;

diplexing the second signal portion within the first frequency band f1 to pass the signals within the second frequency band f2 for transmission to a splitter and to pass the signals within the third frequency band f3 to a combiner;

receiving the first signal portion within the first frequency band f1 from the splitter;

receiving the signals within the third frequency band f3 from a diplexer;

combining, in the downstream direction toward the amplifier, the first signal portion within the first frequency band f1 and the signals within the third frequency band f3; and transmitting the first signal portion within the first frequency band f1 and the signals within the third frequency band f3 in an upstream direction.

* * * * *